(12) United States Patent
Nagarajan (10) Patent No.: US 12,537,672 B2
(45) Date of Patent: Jan. 27, 2026

(54) SECRET-SHARING ENCODING AND DECODING USING EXCLUSIVE OR OPERATIONS

(71) Applicant: Microchip Technology Incorporated, Chandler, AZ (US)

(72) Inventor: Anand Nagarajan, Karnataka (IN)

(73) Assignee: Microchip Technology Incorporated, Chandler, AZ (US)

( * ) Notice: Subject to any disclaimer, the term of this patent is extended or adjusted under 35 U.S.C. 154(b) by 186 days.

(21) Appl. No.: 18/624,300

(22) Filed: Apr. 2, 2024

(65) Prior Publication Data

US 2025/0260561 A1    Aug. 14, 2025

(30) Foreign Application Priority Data

Feb. 12, 2024  (IN) ............................. 202411009330

(51) Int. Cl.
*G06F 21/00* (2013.01)
*H04L 9/08* (2006.01)

(52) U.S. Cl.
CPC .................................. *H04L 9/085* (2013.01)

(58) Field of Classification Search
None
See application file for complete search history.

(56) References Cited

U.S. PATENT DOCUMENTS

| 8,074,068 B2 * | 12/2011 | Fujii | ....................... H04L 9/085 713/160 |
| 9,124,423 B2 * | 9/2015 | Jennas, II | ............. H04L 9/0827 |
| 9,461,821 B1 * | 10/2016 | Machani | ................ H04L 9/0894 |
| 10,536,269 B2 * | 1/2020 | Dolev | .................... H04L 9/3026 |
| 2010/0158249 A1 * | 6/2010 | Ikushima | ................. H04K 1/02 380/255 |

OTHER PUBLICATIONS

Suga, Yuji, "An Algebraic Interpretation of the XOR-based Secret Sharing Schemes," 2018 International Symposium on Information Theory and its Applications (ISITA), pp. 228-231, Oct. 28, 2018.
Chattopadhyay, Arup Kumar et al., "A Verifiable (n, n) Secret Image Sharing Scheme Using XOR Operations," 9th IEEE Annual Ubiquitous Computing, Electronics, and Mobile Communication Conference, pp. 1025-1031, Nov. 8, 2018
International Search Report and Written Opinion, Application No. PCT/US2024/041897, 11 pages, Oct. 29, 2024.

* cited by examiner

*Primary Examiner* — Maung T Lwin
(74) *Attorney, Agent, or Firm* — SLAYDEN GRUBERT BEARD PLLC (57) ABSTRACT

A system and method for a secret-sharing encoding and decoding using exclusive OR (XOR) operations. A first apparatus includes a data splitting circuit to receive a secret and generate first, second, third, and fourth secret segments based on the secret and a secret share encoding circuit to generate first, second, third, and fourth secret shares by application of XOR operations to the first, second, third, and fourth secret segments. A second apparatus includes a secret share decoding circuit to receive first, second, third, and fourth secret shares and generate first, second, third, and fourth secret segments by application of an XOR operation to share encoded data of the first, second, third, and fourth secret shares, and a data aggregating circuit to: receive the first, second, third, and fourth secret segments; and recreate a secret by combining the first, second, third, and fourth secret segments.

21 Claims, 10 Drawing Sheets

FIG. 1

| Encoded Entity | Encoded Value | | | |
|---|---|---|---|---|
| Secret Share 1 | Secret Segment 1 $\oplus$ | Secret Segment 2 $\oplus$ | Secret Segment 3 | |
| Secret Share 2 | Secret Segment 2 $\oplus$ | Secret Segment 3 $\oplus$ | Secret Segment 4 | |
| Secret Share 3 | Secret Segment 3 $\oplus$ | Secret Segment 4 $\oplus$ | Secret Segment 1 | |
| Secret Share 4 | Secret Segment 4 $\oplus$ | Secret Segment 1 $\oplus$ | Secret Segment 2 | |

SECRET-SHARING ENCODING AND DECODING USING EXCLUSIVE OR OPERATIONS

PRIORITY

The present application claims priority to India Patent Application Number 202411009330, filed on Feb. 12, 2024, wherein the entire disclosure is incorporated herein by reference.

TECHNICAL FIELD

The present disclosure relates to secret sharing cryptographic methods, in particular, to systems and methods for a secret-sharing encoding and decoding using exclusive OR (XOR) operations.

BACKGROUND

Secret sharing is a cryptographic method of encoding and distributing data called a "secret" to more than one recipient in the form of encoded texts called "secret shares." Secret sharing schemes are used in cryptographic schemes for securing sensitive information in computing environments. Secret sharing involves a "dealer" breaking up the secret into shares which are encoded fragments of the secret. The dealer distributes the shares to multiple "players." To reconstruct the secret, a minimum subset of the secret shares is decoded and combined to reconstruct the secret. The secret itself is never distributed in plain-text form and can only be decoded if the minimum subset of shares is available. Secret sharing is effective in protecting private data when the collective group is trusted with the secret, but the individual players are not. Specifically, the use of secret shares offers protection during distribution as the secret shares are encoded and one share cannot be used to decipher any part of the secret.

One challenge of existing secret sharing methods is that the aggregated size of the combination of all secret shares is typically "n" times the secret size, which requires "n" times the storage space of the secret. Additionally, existing secret sharing methods require polynomials to encode and decode the secret, which require significant computational power. Thus, there is a need for a method of secret sharing that requires less storage space and computational power to encode and decode the secret.

SUMMARY OF THE INVENTION

Aspects provide systems and methods for a secret-sharing encoding and decoding using exclusive OR (XOR) operations. An apparatus includes a data splitting circuit to receive a secret; and generate a first secret segment, a second secret segment, a third secret segment, and a fourth secret segment based on the secret. The apparatus also includes a secret share encoding circuit to: generate a first secret share by application of an XOR operation to the first, second, and third secret segments; generate a second secret share by application of the XOR operation to the second, third, and fourth secret segments; generate a third secret share by application of the XOR operation to the third, fourth, and first secret segments; and generate a fourth secret share by application of the XOR operation to the fourth, first, and second secret segments.

An apparatus includes a secret share decoding circuit to: receive a first secret share, a second secret share, a third secret share, and a fourth secret share; generate a first secret segment by application of an XOR operation to share encoded data of the first, third, and fourth secret shares; generate a second secret segment by application of the XOR operation to share encoded data of the first, second, and fourth secret shares; generate a third secret segment by application of the XOR operation to share encoded data of the first, second, and third secret shares; and generate a fourth secret segment by application of the XOR operation to share encoded data of the second, third, and fourth secret shares. The apparatus additionally includes a data aggregating circuit to receive the first, second, third, and fourth secret segments; and recreate a secret by combining the first, second, third, and fourth secret segments.

A method includes receiving a secret; generating a first secret segment, a second secret segment, a third secret segment, and a fourth secret segment based on the secret; generating a first secret share by application of an XOR operation to the first, second, and third secret segments; generating a second secret share by application of the XOR operation to the second, third, and fourth secret segments; generating a third secret share by application of the XOR operation to the third, fourth, and first secret segments; and generating a fourth secret share by application of the XOR operation to the fourth, first, and second secret segments.

A method includes receiving a first secret share, a second secret share, a third secret share, and a fourth secret share; generating a first secret segment by application of an XOR operation to share encoded data from the first, third, and fourth secret shares; generating a second secret segment by application of the XOR operation to share encoded data from the first, second, and fourth secret shares; generating a third secret segment by application of the XOR operation to share encoded data from the first, second, and third secret shares; generating a fourth secret segment by application of the XOR operation to share encoded data from the second, third, and fourth secret shares; receiving the first, second, third, and fourth secret segments; and recreating a secret by combining the first, second, third, and fourth secret segments.

BRIEF DESCRIPTION OF THE DRAWINGS

The figures illustrate examples of systems and methods for a secret-sharing encoding and decoding using exclusive OR (XOR) operations.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

According to an aspect of the invention, systems and methods for a secret-sharing encoding and decoding using exclusive OR (XOR) operations is provided. The shares are distributed to recipients and can then be decoded using tetrahedron code to recreate the secret. The collective size of all shares is, at most, only up to seven bytes greater than the secret itself, and in many cases is the same size as the secret itself such that little or no additional storage is needed. The use of tetrahedron code to create the shares from the secret provides a new capability to share any private data with multiple trusted parties in a storage and computationally efficient manner. The systems and methods may be used for military applications, cryptographic key distribution in cloud computing environments, financial institutions, and sensor networks, without limitation.

Figure 1:
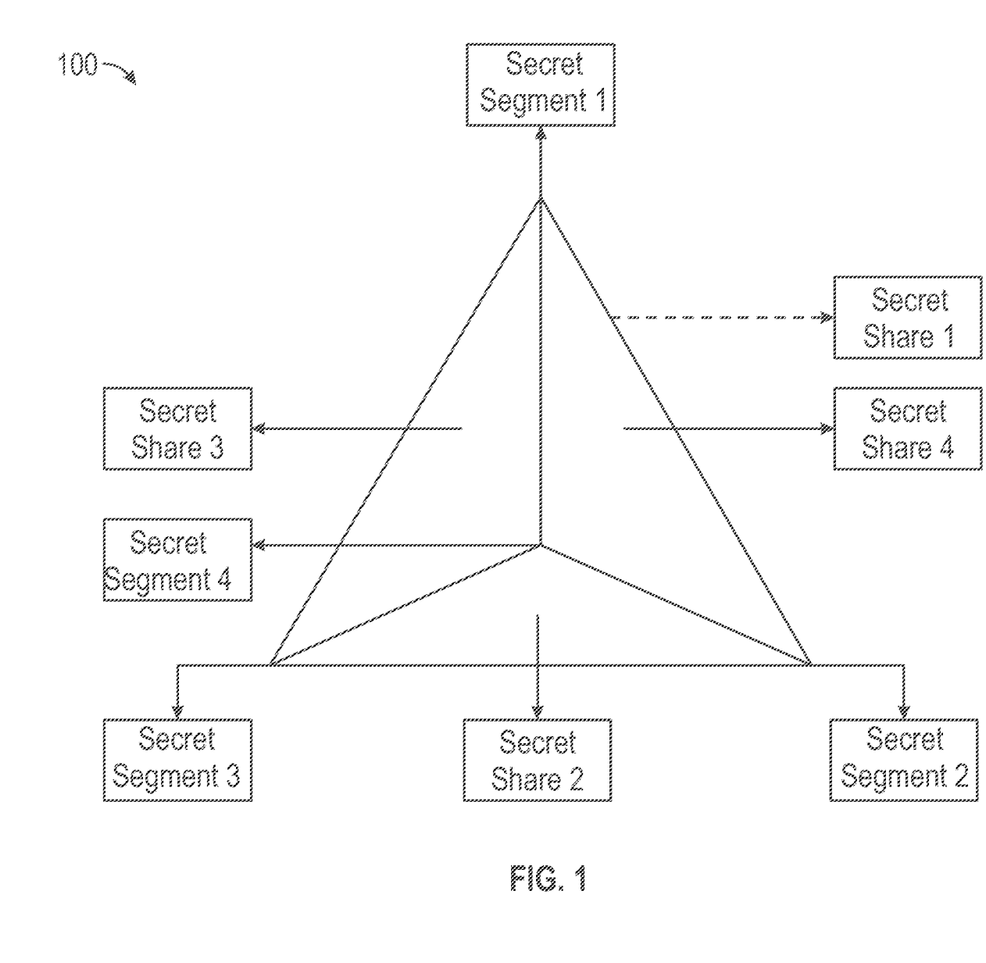
FIG. 1 illustrates a tetrahedron code model for encoding a secret into secret shares, according to examples of the present disclosure.

FIG. 1 illustrates a tetrahedron code model for encoding a secret into secret shares, according to examples of the present disclosure. A secret may be divided into four secret segments. Specifically, the secret may have "n" bytes and respective secret segments of the secret contains "n/4" bytes. For example, a plain-text secret may be "ABCDEFGH" and may be divided into four secret segments: secret segment 1 is "AB," secret segment 2 is "CD," secret segment 3 is "EF," and secret segment 4 is "GH." In examples where the number of bytes of the secret is not evenly divisible by four, additional bytes may be added to the end of the secret such that the secret is evenly divisible by four. For example, zeroes may be added to the end of the secret. The four secret segments may then be encoded into four secret shares using a "regular tetrahedron" based encoding using bitwise XOR operations to produce four secret shares: secret share 1, secret share 2, secret share 3, and secret share 4. There is no requirement that the secret be in plain-text, and the secret itself may be encoded by other encoding means.

FIG. 1 illustrates the layout of data geometrically on a regular tetrahedron 200 and visually represents the secret segment and secret share corresponding to the three-dimensional tetrahedron 200. Each vertex may be associated with a given secret segment (labelled Secret Segment <Identifier> in FIG. 1). Each face may represent a given secret share (labelled with Secret Share <Identifier> in FIG. 1). A given face of tetrahedron 100 has three associated vertices. The secret shares may be encoded using a bitwise exclusive OR (XOR) operation based on the secret segments corresponding to the vertices associated with the face representing the given secret share, as explained further with respect to FIG. 2.

Figure 2:
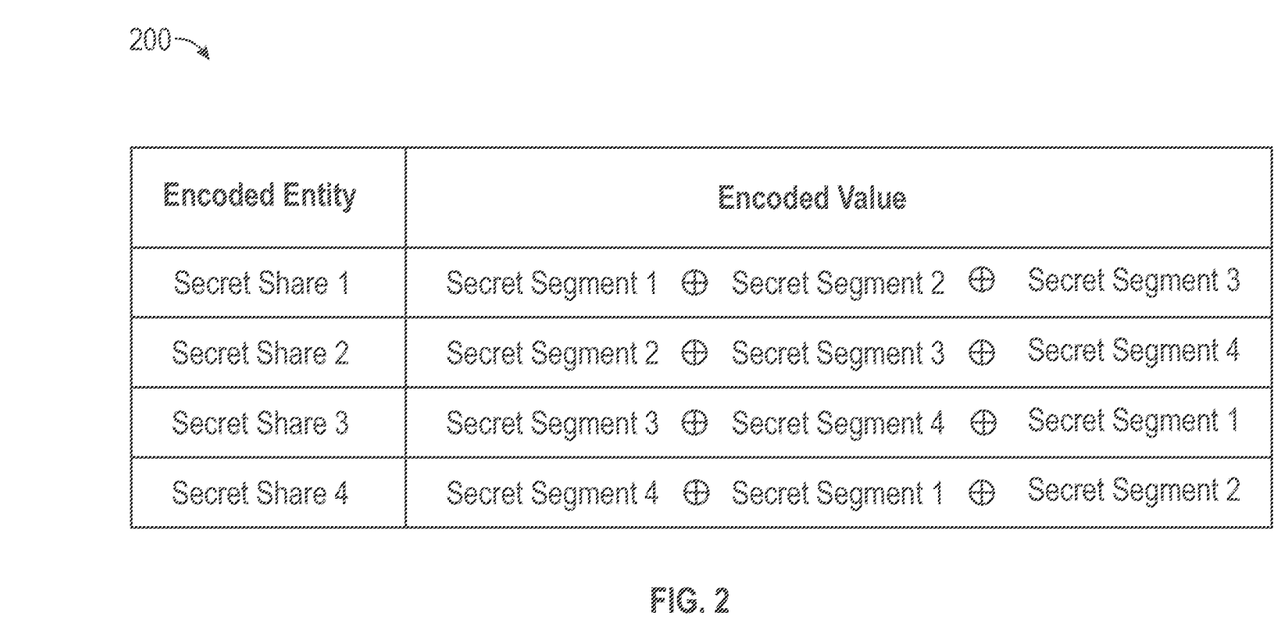
FIG. 2 illustrates a bitwise XOR calculation for the tetrahedron code model shown in FIG. 1, according to examples of the present disclosure.

FIG. 2 illustrates a bitwise XOR calculation for the tetrahedron code model shown in FIG. 1, according to examples of the present disclosure. Each row of table 200 indicates the various data elements that are involved in computing a respective secret share. The relationship between a given secret share with three secret segments corresponding to the vertices associated with the face representing the given secret share is indicated in table 200. The three secret segments may be involved in the XOR operation used to generate the secret share and "circle+" indicates bitwise XOR operation. In particular, secret share 1 is calculated based on secret segment 1, secret segment 2 and secret segment 3 (e.g., secret segment 1 XOR secret segment 2 XOR secret segment 3); secret share 2 is calculated based on secret segment 2, secret segment 3 and secret segment 4 (e.g., secret segment 2 XOR secret segment 3 XOR secret segment 4); secret share 3 is calculated based on secret segment 3, secret segment 4 and secret segment 1 (e.g., secret segment 3 XOR secret segment 4 XOR secret segment 1); and secret share 4 is calculated based on secret segment 4, secret segment 1 and secret segment 2 (e.g., secret segment 4 XOR secret segment 1 XOR secret segment 2).

Figure 3:
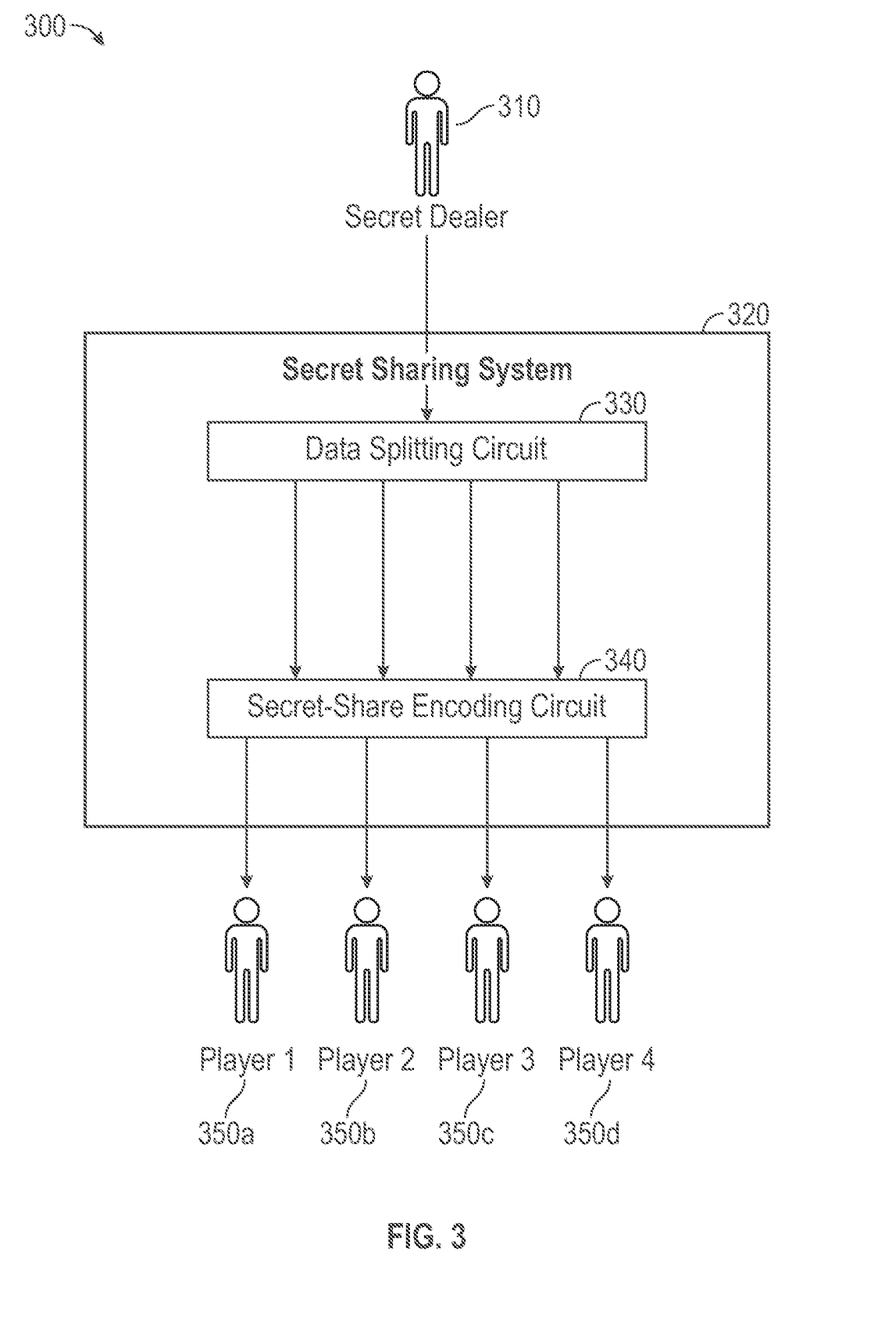
FIG. 3 illustrates a system for encoding a secret into four shares, according to examples of the present disclosure.

FIG. 3 illustrates a system for encoding a secret into four shares, according to examples of the present disclosure. Secret dealer 310 may provide a secret of size n bytes to secret sharing system 320. For example, the secret may have a size of eight bytes with the plain text "ABCDEFGH." There is no requirement that the secret be in plain-text, and the secret itself may be encoded by other encoding means.

Secret sharing system 320 may include data splitting circuit 330 and secret-share encoding circuit 340. Secret sharing system 320 may be a trust platform implemented in any suitable combination of analog and digital circuitry, such as a suitable microprocessor, microcontroller, control board, or other computing device having input and output interfaces for communicating with other devices, as well as memory or other storage for program logic/instructions that secret sharing system 320 executes to send and receive signals and process data. Data splitting circuit 330 may split the secret into four secret segments as described with respect to FIG. 1. For example, the eight-byte secret may be split into four secret segments of two bytes each (e.g., "ABCDEFGH" may be divided into four secret segments: secret segment 1: "AB," secret segment 2: "CD," secret segment 3: "EF," and secret segment 4: "GH"). Secret-share encoding circuit 340 may encode four secret shares based on the secret segments using a bitwise XOR operation, as described with respect to FIGS. 1-2 and 4. Secret sharing system 320 may distribute the four secret shares to four players 350a-350d.

Figure 4:
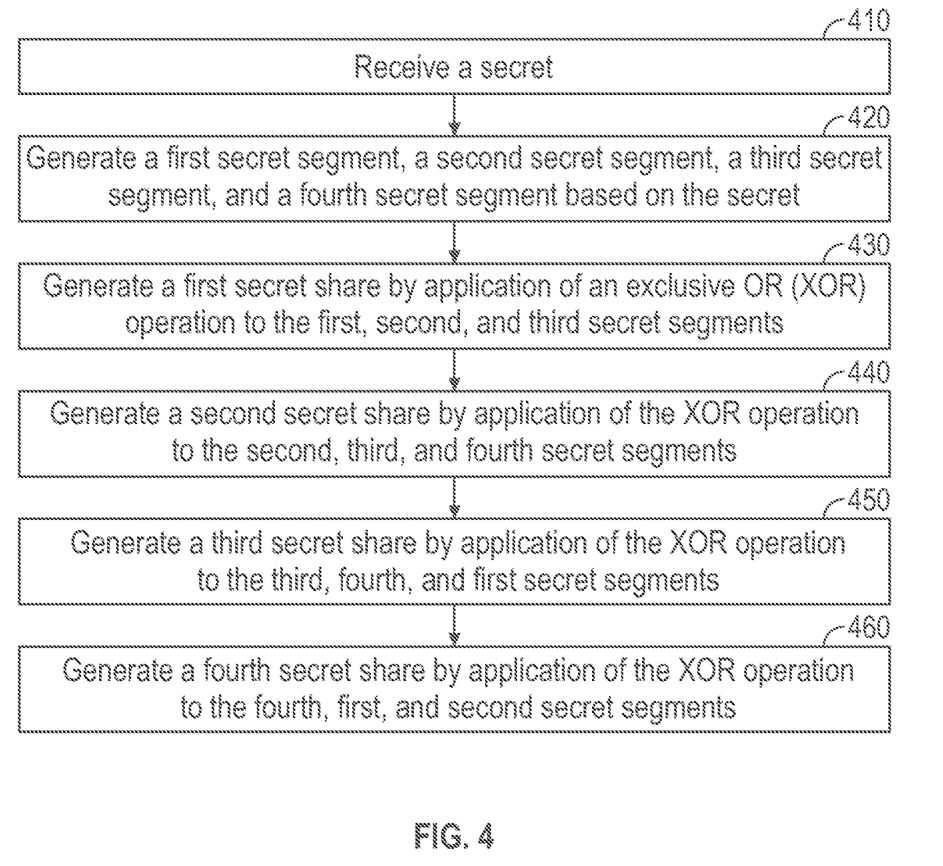
FIG. 4 illustrates a method performed for encoding a secret into secret shares, according to examples of the present disclosure.

FIG. 4 illustrates a method performed for encoding a secret into secret shares, according to examples of the present disclosure. Method 400 may be implemented using a secret share encoding circuit, a secret sharing system, a trust platform, in combination with a processor, or any other system operable to implement method 400. Although examples have been described above, other variations and examples may be made from this disclosure without departing from the spirit and scope of these disclosed examples. There is no requirement that the secret be in plain-text, and the secret itself may be encoded by other encoding means.

Method 400 may begin at block 410 where a secret of size n-bytes that is to be encoded may be received. For example, the secret may have a size of eight bytes with the plain text "ABCDEFGH."

At block 420, a first secret segment, a second secret segment, a third secret segment, and a fourth secret segment based on the secret received at block 410 may be generated. The four secret segments may be generated by splitting the compete secret of n-bytes into four non-overlapping secret segments having a size of n/4 bytes. The secret segments may be generated in an ascending order, or in any other predetermined order. A given secret segment may be associated with a different vertex of the tetrahedron in a predetermined order of traversal of vertices. Thus, the order of generation of the secret segment may not need to be stored because during the decoding process, described below with respect to FIGS. 6-9, the secret segments associated with vertices may be decoded based on the predetermined traversal order of the faces of the tetrahedron.

At block 430, a first secret share may be generated by application of an XOR operation to the first, second, and third secret segments. The first secret share may be formed of a header and share encoded data and the XOR operation may be used to generate the share encoded data. The header may identify the secret share, e.g. identify if it is secret share 1, secret share 2, secret share 3 or secret share 4, and is described in more detail with respect to FIGS. 10a and 10b. The secret segments used in the XOR operation may be based on the vertices incident to the face of a tetrahedron corresponding to the first secret share. The XOR operation may be a bitwise XOR operation including a first bitwise XOR operation of the first secret segment with the second secret segment and a second bitwise XOR operation of the result of the first bitwise XOR operation and the third secret segment.

At block 440, a second secret share may be generated by application of an XOR operation to the second, third, and fourth secret segments. The second secret share may be formed of a header (e.g., identifying the second secret share as having a secret share ID of 2) and share encoded data and the XOR operation may be used to generate the share encoded data. The secret segments used in the XOR operation may be based on the vertices incident to the face of a tetrahedron corresponding to the second secret share. The XOR operation may be a bitwise XOR operation including a first bitwise XOR operation of the second secret segment with the third secret segment and a second bitwise XOR operation of the result of the first bitwise XOR operation and the fourth secret segment.

At block 450, a third secret share may be generated by application of an XOR operation to the third, fourth, and first secret segments. The third secret share may be formed of a header (e.g., identifying the second secret share as having a secret share ID of 3) and share encoded data and the XOR operation may be used to generate the share encoded data. The secret segments used in the XOR operation may be based on the vertices incident to the face of a tetrahedron corresponding to the third secret share. The XOR operation may be a bitwise XOR operation including a first bitwise XOR operation of the third secret segment with the fourth secret segment and a second bitwise XOR operation of the result of the first bitwise XOR operation and the first secret segment.

At block 460, a fourth secret share may be generated by application of an XOR operation to the fourth, first, and second secret segments. The fourth secret share may be formed of a header (e.g., identifying the second secret share as having a secret share ID of 2) and share encoded data and the XOR operation may be used to generate the share encoded data. The secret segments used in the XOR operation may be based on the vertices incident to the face of a tetrahedron corresponding to the fourth secret share. The XOR operation may be a bitwise XOR operation including a first bitwise XOR operation of the fourth secret segment with the first secret segment and a second bitwise XOR operation of the result of the first bitwise XOR operation and the second secret segment.

Although FIG. 4 discloses a particular number of operations related to method 400, method 400 may be executed with greater or fewer operations than those depicted in FIG. 4. In addition, although FIG. 4 discloses a certain order of operations to be taken with respect to method 400, the operations comprising method 400 may be completed in any suitable order.

Figure 5:
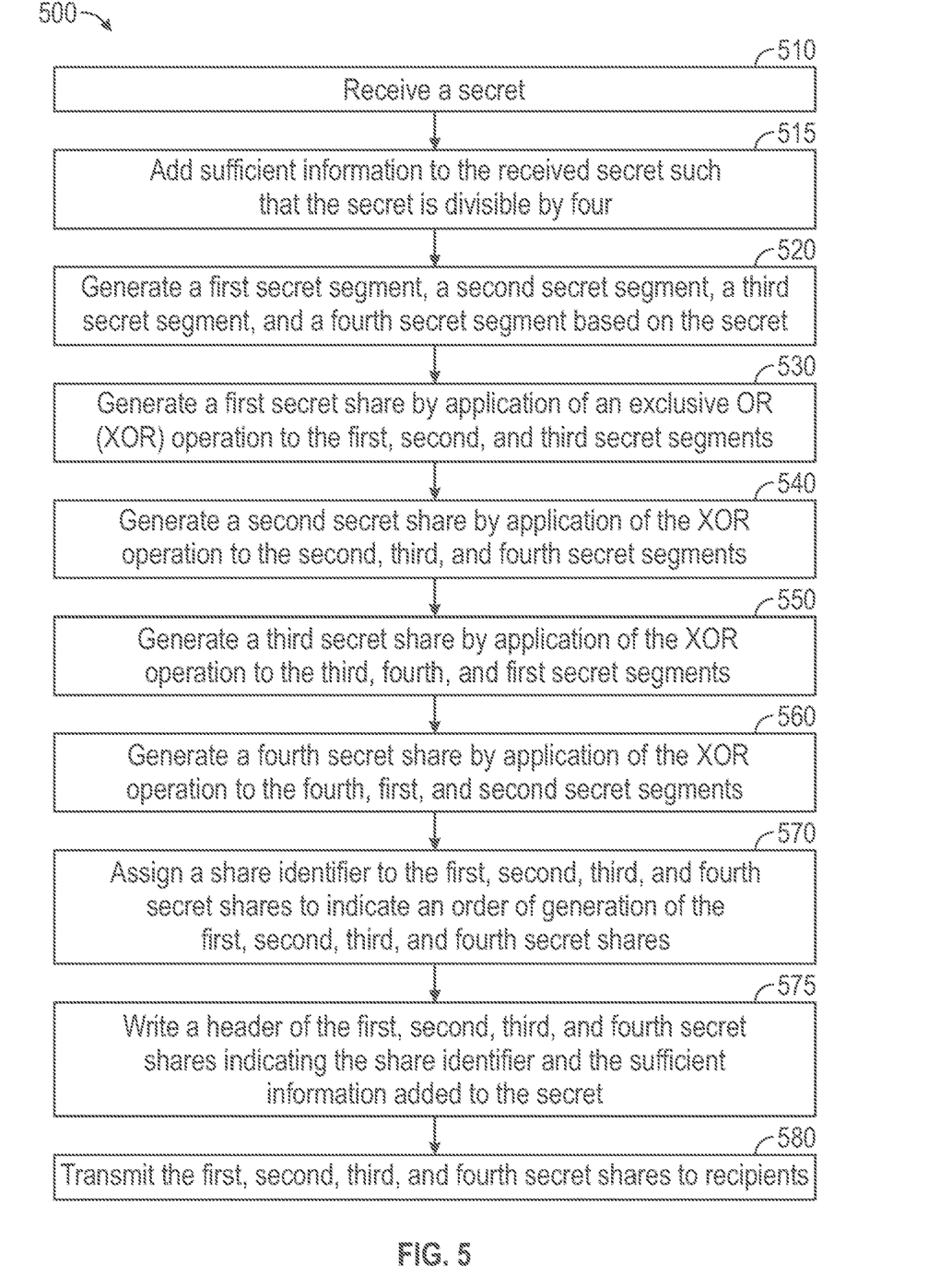
FIG. 5 illustrates a more detailed version of the method described in FIG. 4, according to examples of the present disclosure.

FIG. 5 illustrates a more detailed version of the method described in FIG. 4, according to examples of the present disclosure. Method 500 may be implemented using a secret share encoding circuit, a secret sharing system, a trust platform, in combination with a processor, or any other system operable to implement method 500. Although examples have been described above, other variations and examples may be made from this disclosure without departing from the spirit and scope of these disclosed examples.

Method 500 may begin at block 510 where a s a secret of size n-bytes that is to be encoded may be received.

At block 515, sufficient information may be added to the secret received at block 510 such that the secret is divisible by four. The sufficient information may be zeroes added to the end of the secret (hereinafter "p" bytes). In an example where the secret has a size of ten bytes, two bytes of zeroes may be added to the end of the secret. Zeroes may be added to the end of the secret without changing the result of the XOR operations performed at blocks 520-560 due to idempotency with XOR operations.

At block 520, a first secret segment, a second secret segment, a third secret segment, and a fourth secret segment may be generated based on the secret received at block 510. In examples where the secret is divisible by four and comprises n bytes, the four secret segments may be generated by splitting the secret of n-bytes into four non-overlapping secret segments each having a size of n/4 bytes. In examples where the secret is not divisible by four, the four secret segments may be generated by splitting the secret of n-bytes plus bytes added at block 515 (e.g., the "p" bytes) into four non-overlapping secret segments each having a size of (n+p)/4 bytes. The secret segments may be generated in an ascending order, or in any other predetermined order. A given secret segment may be associated with a different vertex of the tetrahedron in a predetermined order of traversal of vertices. Thus, the order of generation of the secret segment need not be stored, because during the decoding process, described below with respect to FIGS. 6-9, the secret segments associated with vertices may be decoded based on the predetermined traversal order of the faces of the tetrahedron.

At block 530, a first secret share may be generated by application of an XOR operation to the first, second, and third secret segments. The first secret share may be formed of a header and share encoded data and the XOR operation may be used to generate the share encoded data. The secret segments used in the XOR operation may be based on the vertices incident to the face of a tetrahedron corresponding to the first secret share. The XOR operation may be a bitwise XOR operation including a first bitwise XOR operation of the first secret segment with the second secret segment and a second bitwise XOR operation of the result of the first bitwise XOR operation and the third secret segment.

At block 540, a second secret share may be generated by application of an XOR operation to the second, third, and fourth secret segments. The second secret share may be formed of a header and share encoded data and the XOR operation may be used to generate the share encoded data. The secret segments used in the XOR operation may be based on the vertices incident to the face of a tetrahedron corresponding to the second secret share. The XOR operation may be a bitwise XOR operation including a first bitwise XOR operation of the second secret segment with the third secret segment and a second bitwise XOR operation of the result of the first bitwise XOR operation and the fourth secret segment.

At block 550, a third secret share may be generated by application of an XOR operation to the third, fourth, and first secret segments. The third secret share may be formed of a header and share encoded data and the XOR operation may be used to generate the share encoded data. The secret segments used in the XOR operation may be based on the vertices incident to the face of a tetrahedron corresponding to the third secret share. The XOR operation may be a bitwise XOR operation including a first bitwise XOR operation of the third secret segment with the fourth secret segment and a second bitwise XOR operation of the result of the first bitwise XOR operation and the first secret segment.

At block 560, a fourth secret share may be generated by application of an XOR operation to the fourth, first, and second secret segments. The fourth secret share may be formed of a header and share encoded data and the XOR operation may be used to generate the share encoded data. The secret segments used in the XOR operation may be based on the vertices incident to the face of a tetrahedron corresponding to the fourth secret share. The XOR operation may be a bitwise XOR operation including a first bitwise XOR operation of the fourth secret segment with the first secret segment and a second bitwise XOR operation of the result of the first bitwise XOR operation and the second secret segment.

At block 570, a share identifier may be assigned to the first, second, third, or fourth secret shares to indicate an order of generation of the first, second, third, and fourth secret shares. The share identifier may indicate the given face of the tetrahedron represented by the secret share. The share identifier may form part of the header of the secret share. The share header is described in more detail with respect to FIGS. 10a and 10b.

At block 575, a header of the first, second, third, and fourth secret shares may be written, respectively indicating the share identifier and the amount of the sufficient information added to the secret. The amount of sufficient information written to the header may indicate the number of zeroes added to the secret at block 515. The share identifier may be the identifier assigned at block 570. The share header is described in more detail with respect to FIGS. 10a and 10b.

At block 580, the first, second, third, or fourth secret shares may be transmitted to respective recipients. In some examples, the secret shares may be transmitted to different recipients through different transmission media.

Although FIG. 5 discloses a particular number of operations related to method 500, method 500 may be executed with greater or fewer operations than those depicted in FIG. 5. In addition, although FIG. 5 discloses a certain order of operations to be taken with respect to method 500, the operations comprising method 500 may be completed in any suitable order.

Figure 6:
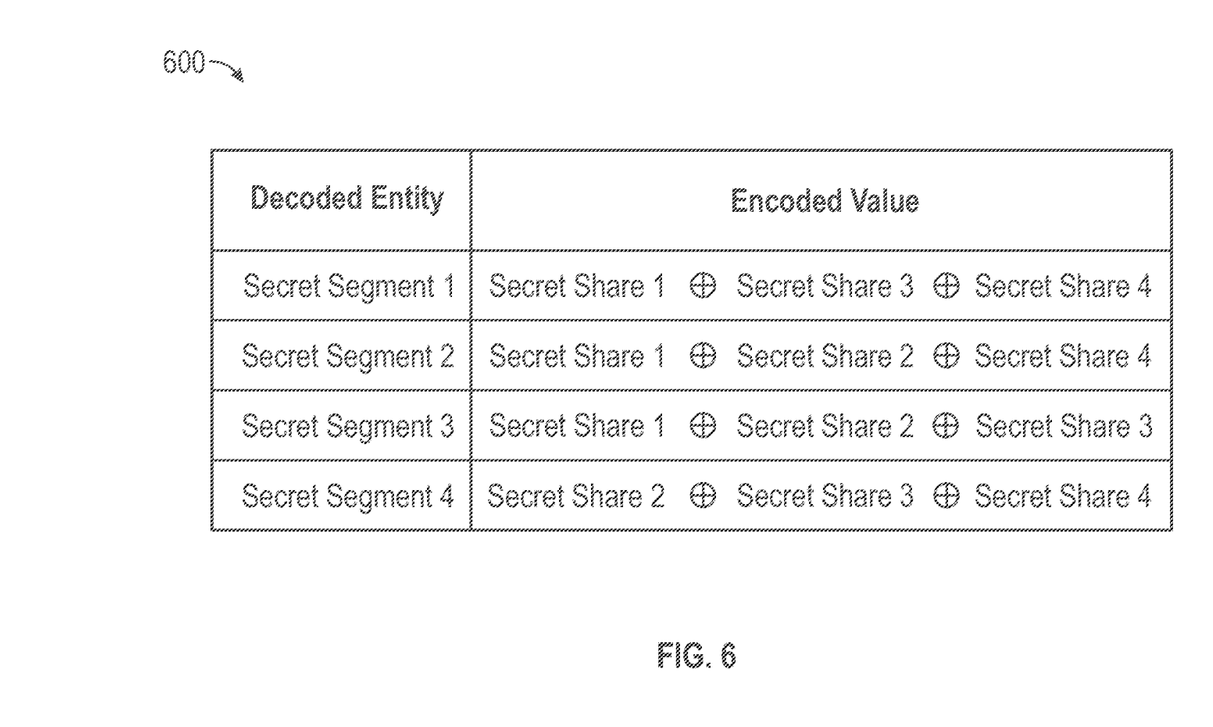
FIG. 6 illustrates a bitwise XOR calculation to decode secret segments from secret shares, according to examples of the present disclosure.

FIG. 6 illustrates a bitwise XOR calculation to decode secret segments from secret shares, according to examples of the present disclosure. The tetrahedron model described with respect to FIG. 1 may be used to decode a secret from secret shares. Specifically, as described in further detail with respect to FIGS. 6-8, a secret segment is reconstructed from the three shares represented by the faces incident to the vertex of the secret.

The relationship between a given secret segment with three secret shares is indicated in table 600. Each row of table 600 indicates the various data elements that are involved in computing a secret segment. A given vertex in tetrahedron 100 (shown in FIG. 1) has three faces incident to the given vertex. The three secret shares may be involved in the XOR operation used to generate the secret segment and "circle+" indicates bitwise XOR operation. In particular, secret segment 1 is calculated based on secret share 1, secret share 3 and secret share 4 (e.g., secret share 1 XOR secret share 3 XOR secret share 4); secret segment 2 is calculated based on secret share 1, secret share 2 and secret share 4 (e.g., secret share 1 XOR secret share 2 XOR secret share 4); secret segment 3 is calculated based on secret share 1, secret share 2 and secret share 3 (e.g., secret share 1 XOR secret share 2 XOR secret share 3); and secret segment 4 is calculated based on secret share 2, secret share 3 and secret share 4 (e.g., secret share 2 XOR secret share 3 XOR secret share 4).

A secret may then be recreated from the four secret segments. Secret segment 1, secret segment 2, secret segment 3, and secret segment 4 may be combined to recreate the complete secret. For example, secret segment 1 may be "AB," secret segment 2 may be "CD," secret segment 3 may be "EF," and secret segment 4 may be "GH." The secret may be created by combining, or rearranging according to a predetermined order, secret segment 1, secret segment 2, secret segment 3, and secret segment 4 to decode the complete secret as "ABCEDFGH."

Figure 7:
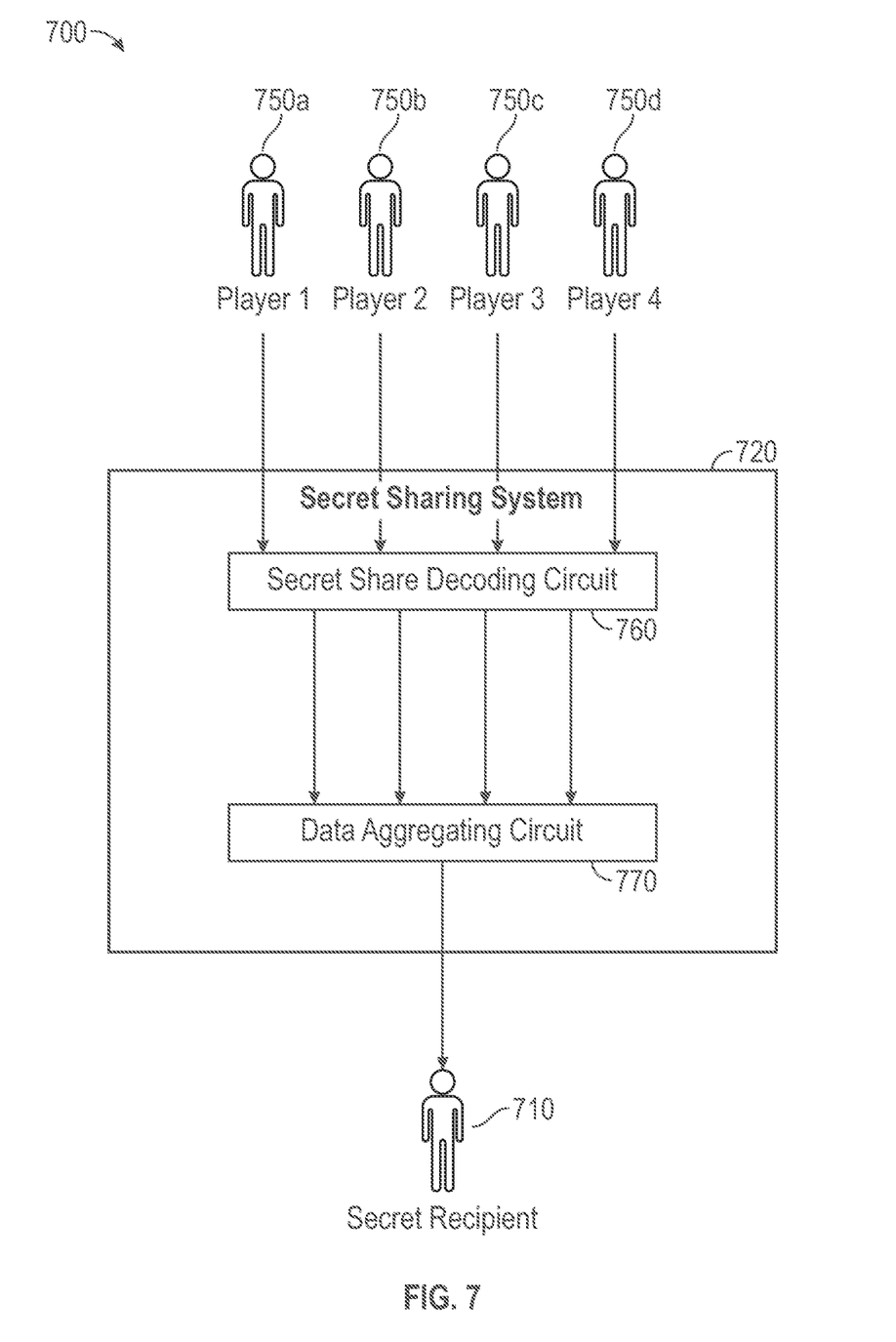
FIG. 7 illustrates a system for decoding four secret shares into a secret, according to examples of the present disclosure.

FIG. 7 illustrates a system 700 for decoding four secret shares to recreate a secret, according to examples of the present disclosure. Four players 750a-750d may provide four encoded secret shares to secret sharing system 720. A given secret share may be of size n/4-bytes, where "n" is the number of bytes of the secret. For example, the secret may have a size of eight bytes and a given secret share may have a size of two bytes, without taking into account any header.

Secret sharing system 720 may include secret share decoding circuit 760 and data aggregating circuit 770. Secret sharing system 720 may be a trust platform implemented in any suitable combination of analog and digital circuitry, such as a suitable microprocessor, microcontroller, control board, or other computing device having input and output interfaces for communicating with other devices, as well as memory or other storage for program logic/instructions that secret sharing system 720 executes to send and receive signals and process data. Secret share decoding circuit 760 may decode the four secret shares in to four secret segments as described with respect to FIGS. 6 and 8-9. For example, the four secret shares may be decoded as secret segment 1: "AB," secret segment 2: "CD," secret segment 3: "EF," and secret segment 4: "GH." Data aggregating circuit 770 may combine the four secrets to recreate the secret as described with respect to FIGS. 6 and 8-9. For example, data aggregating circuit 770 may combine secret segment 1, secret segment 2, secret segment 3, and secret segment 4 to recreate the secret "ABCDEFGH." Secret sharing system 720 may distribute the complete secret to secret recipient 710. Secret recipient 710 may be any other system which may use the secret.

Figure 8:
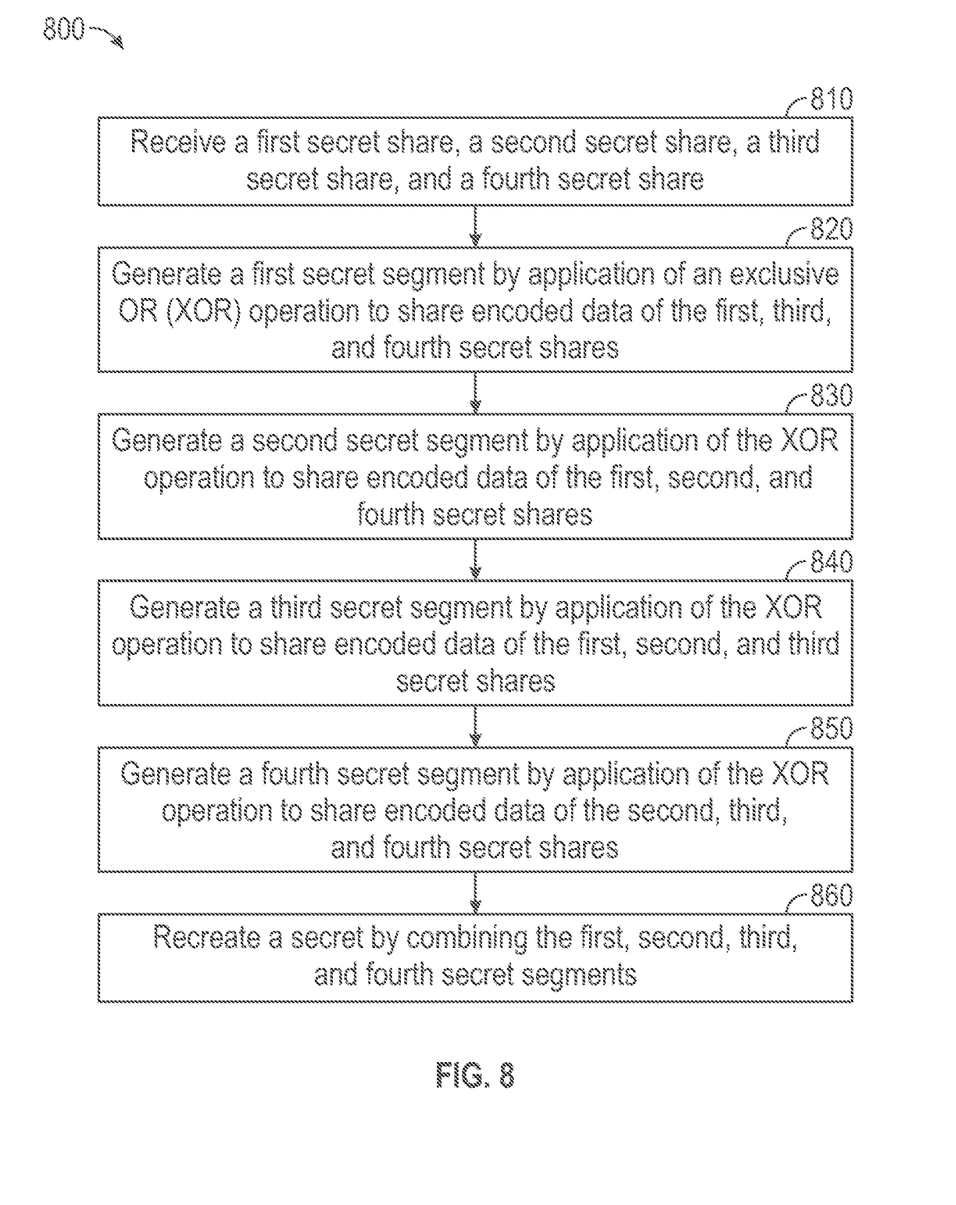
FIG. 8 illustrates a method performed for decoding four secret shares to recreate a secret, according to examples of the present disclosure.

FIG. 8 illustrates a method performed for decoding secret shares to recreate the secret, according to examples of the present disclosure. Method 800 may be implemented using a secret share decoding circuit, a secret sharing system, a trust platform, in combination with a processor, or any other system operable to implement method 800. Although examples have been described above, other variations and examples may be made from this disclosure without departing from the spirit and scope of these disclosed examples.

Method 800 may begin at block 810, where a first secret share, a second secret share, a third secret share, and a fourth secret share may be received. The secret shares may be received over a transmission media, such as a network packet, a message, an email, paper, mail, electronic media, or any other suitable transmission media. In some examples, the secret shares may be received from at least two different transmission media sources.

At block 820, a first secret segment may be generated by application of an XOR operation to share encoded data of the first, third, and fourth secret shares. A given secret share may be formed of a header and share encoded data and the XOR operation only uses the share encoded data. The secret shares used in the XOR operation may be based on the faces incident to the vertex of a tetrahedron corresponding to the first secret segment. The XOR operation may be a bitwise XOR operation including a first bitwise XOR operation of the first secret share with the third secret share and a second bitwise XOR operation of the result of the first bitwise XOR operation and the fourth secret share.

At block 830, a second secret segment may be generated by application of an XOR operation to share encoded data of the first, second, and fourth secret shares. A given secret share may be formed of a header and share encoded data and the XOR operation only uses the share encoded data. The secret shares used in the XOR operation may be based on the faces incident to the vertex of a tetrahedron corresponding to the second secret segment. The XOR operation may be a bitwise XOR operation including a first bitwise XOR operation of the first secret share with the second secret share and a second bitwise XOR operation of the result of the first bitwise XOR operation and the fourth secret share.

At block 840, a third secret segment may be generated by application of an XOR operation to share encoded data of the first, second, and third secret shares. A given secret share may be formed of a header and share encoded data and the XOR operation only uses the share encoded data. The secret shares used in the XOR operation may be based on the faces incident to the vertex of a tetrahedron corresponding to the third secret segment. The XOR operation may be a bitwise XOR operation including a first bitwise XOR operation of the first secret share with the second secret share and a second bitwise XOR operation of the result of the first bitwise XOR operation and the third secret share.

At block 850, a fourth secret segment may be generated by application of an XOR operation to share encoded data of the second, third, and fourth secret shares. A given secret share may be formed of a header and share encoded data and the XOR operation only uses the share encoded data. The secret shares used in the XOR operation may be based on the faces incident to the vertex of a tetrahedron corresponding to the fourth secret segment. The XOR operation may be a bitwise XOR operation including a first bitwise XOR operation of the second secret share with the third secret share and a second bitwise XOR operation of the result of the first bitwise XOR operation and the fourth secret share.

At block 860, the secret may be recreated by combining, or rearranging according to a predetermined order, the first, second, third, and fourth secret segments into a single secret.

Although FIG. 8 discloses a particular number of operations related to method 800, method 800 may be executed with greater or fewer operations than those depicted in FIG. 8. In addition, although FIG. 8 discloses a certain order of operations to be taken with respect to method 800, the operations comprising method 800 may be completed in any suitable order.

Figure 9:
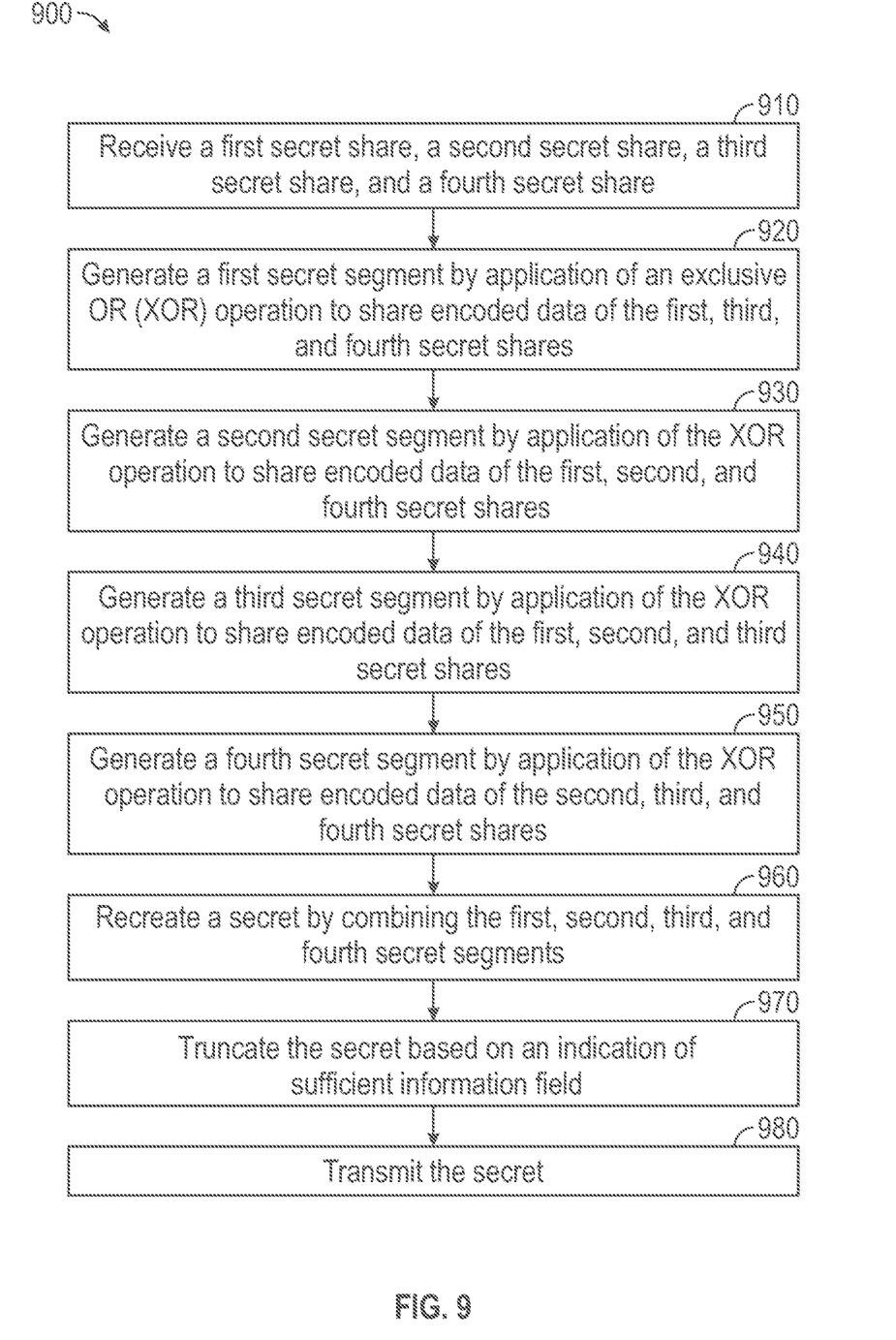
FIG. 9 illustrates a more detailed version of the method described in FIG. 8, according to examples of the present disclosure.

FIG. 9 illustrates a more detailed version of the method described in FIG. 8, according to examples of the present disclosure. Method 900 may be implemented using a secret share decoding circuit, a secret sharing system, a trust platform, in combination with a processor, or any other system operable to implement method 900. Although examples have been described above, other variations and examples may be made from this disclosure without departing from the spirit and scope of these disclosed examples.

Method 900 may begin at block 910, where a first secret share, a second secret share, a third secret share, and a fourth secret share may be received. The secret shares may be received over a transmission media, such as a network connection. In some examples, the secret shares may be received from at least two different transmission media sources.

At block 920, a first secret segment may be generated by application of an XOR operation to share encoded data of the first, third, and fourth secret shares. A given secret share may be formed of a header and share encoded data. In the event that the header was not utilized in generated the respective secret segment, e.g., was not part of the XOR operation which generated the respective secret segment, the header is stripped prior to generating the first secret segment. The secret shares used in the XOR operation may be based on the faces incident to the vertex of a tetrahedron corresponding to the first secret segment. The XOR operation may be a bitwise XOR operation including a first bitwise XOR operation of the first secret share with the third secret share and a second bitwise XOR operation of the result of the first bitwise XOR operation and the fourth secret share.

At block 930, a second secret segment may be generated by application of an XOR operation to share encoded data of the first, second, and fourth secret shares. A given secret share may be formed of a header and share encoded data. In the event that the header was not utilized in generated the respective secret segment, e.g., was not part of the XOR operation which generated the respective secret segment, the header is stripped prior to generating the first secret segment. The secret shares used in the XOR operation may be based on the faces incident to the vertex of a tetrahedron corresponding to the second secret segment. The XOR operation may be a bitwise XOR operation including a first bitwise XOR operation of the first secret share with the second secret share and a second bitwise XOR operation of the result of the first bitwise XOR operation and the fourth secret share.

At block 940, a third secret segment may be generated by application of an XOR operation to share encoded data of the first, second, and third secret shares. A given secret share may be formed of a header and share encoded data. In the event that the header was not utilized in generated the respective secret segment, e.g., was not part of the XOR operation which generated the respective secret segment, the header is stripped prior to generating the first secret segment.

The secret shares used in the XOR operation may be based on the faces incident to the vertex of a tetrahedron corresponding to the third secret segment. The XOR operation may be a bitwise XOR operation including a first bitwise XOR operation of the first secret share with the second secret share and a second bitwise XOR operation of the result of the first bitwise XOR operation and the third secret share.

At block 950, a fourth secret segment may be generated by application of an XOR operation to share encoded data of the second, third, and fourth secret shares. A given secret share may be formed of a header and share encoded data. In the event that the header was not utilized in generated the respective secret segment, e.g., was not part of the XOR operation which generated the respective secret segment, the header is stripped prior to generating the first secret segment. The secret shares used in the XOR operation may be based on the faces incident to the vertex of a tetrahedron corresponding to the fourth secret segment. The XOR operation may be a bitwise XOR operation including a first bitwise XOR operation of the second secret share with the third secret share and a second bitwise XOR operation of the result of the first bitwise XOR operation and the fourth secret share.

At block 960, the secret may be recreated by combining, or rearranging according to a predetermined order, the first, second, third, and fourth secret segments into a single secret. In some examples, the secret segments may be combined based on an order indicated in a sequence indicator. For example, a header of the first, second, third, and fourth secret shares may include a share identifier indicating an order the secret segments when combining the secret segments to create the secret.

At block 970, the secret may be truncated based on an indication of sufficient information field. For example, if the secret is not divisible by four, the secret share decoding circuit may have added zeroes to the secret prior to encoding the secret shares such that the secret would be divisible by four as described with respect to block 515 in FIG. 5. The header of the secret shares may indicate the number of zeroes added to the secret. At block 970, the zeroes may be removed from the secret recreated at block 960 based on the information in the header of the secret shares.

At block 980, the recreated secret may be transmitted.

Although FIG. 9 discloses a particular number of operations related to method 900, method 900 may be executed with greater or fewer operations than those depicted in FIG. 9. In addition, although FIG. 9 discloses a certain order of operations to be taken with respect to method 900, the operations comprising method 900 may be completed in any suitable order.

Figure 10A:
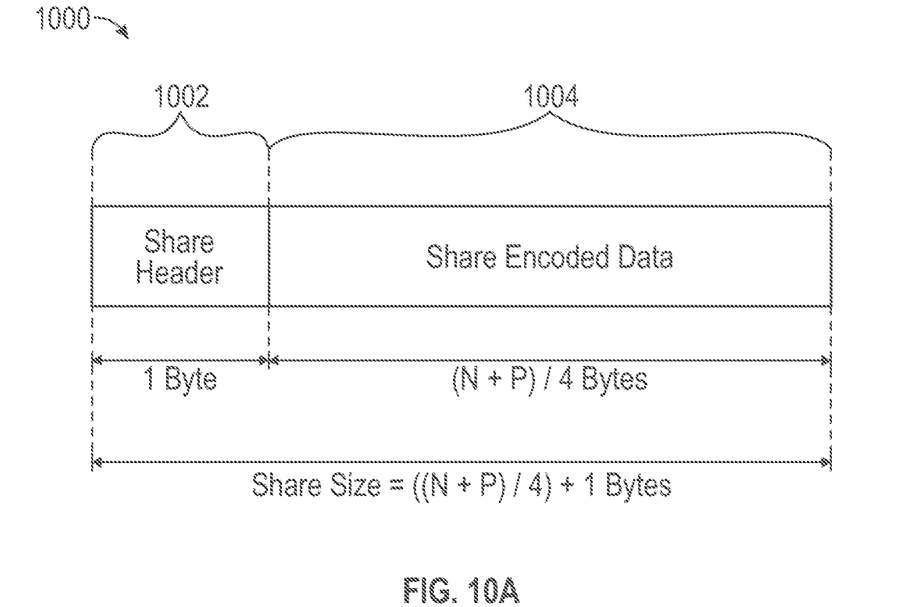
FIG. 10a illustrates a secret share including a share header and share encoded data, according to examples of the present disclosure.

FIG. 10a illustrates a secret share including a share header and share encoded data, according to examples of the present disclosure. Secret share 1000 may include share header 1002 (described in more detail with respect to FIG. 10b) and share encoded data 1004. In some examples, share header 1002 may have a size of one byte. However, share header 1002 may have any other suitable size. Share encoded data 1004 may have a size equal to one-fourth of the number of bytes of the secret plus any additional zeroes added to the secret to make the secret evenly divisible by four (as described in further detail with respect to block 515 in FIG. 5).

Figure 10B:
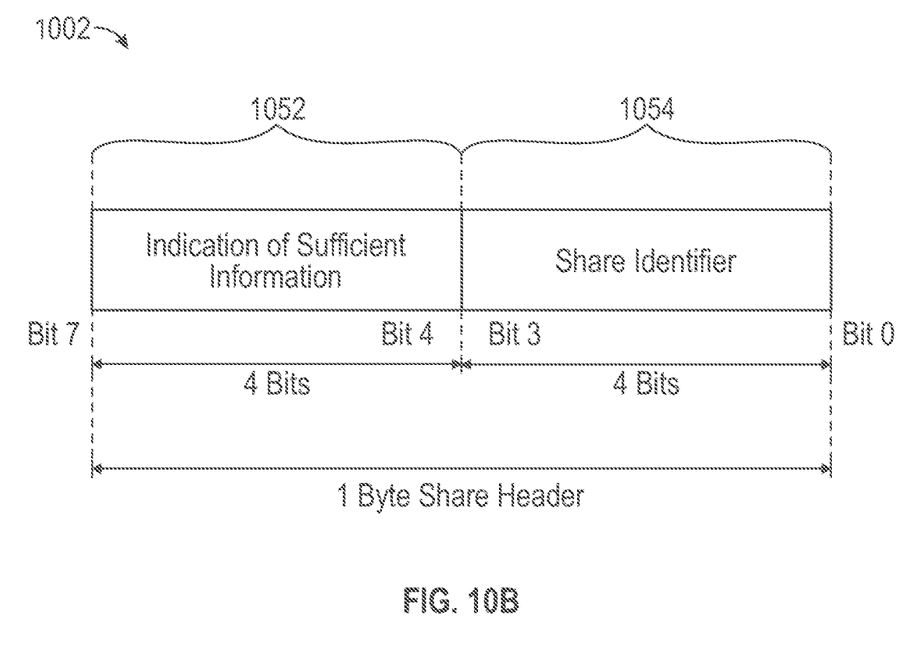
FIG. 10b illustrates a share header of a secret share, according to examples of the present disclosure.

FIG. 10b illustrates a share header of a secret share, according to examples of the present disclosure. Share header 1002 may include indication of sufficient information 1052 and share identifier 1054. In examples where the size of share header 1002 is one byte, indication of sufficient information 1052 may have a size of four bits and may include information regarding whether sufficient information was added to the secret (as described in further detail with respect to block 515 in FIG. 5). Share identifier 1054 may have a size of four bits and may include a share identifier indicating the order of generation of the secret share (e.g., indicating the given face of the tetrahedron represented by the secret share). In some examples, indication of sufficient information 1052 may be included in share header 1002 of a subset of secret shares (e.g., one secret share includes indication of sufficient information 1052). While shown in FIG. 10b as having a size of four bits, indication of sufficient information 1052 and share identifier 1054 may have any suitable size.

By using the systems and methods disclosed above, encoded secret shares may be transmitted to individual entities (e.g., players), minimizing concern about data theft and misuse. To decode the secret shares and access the secret, all secret shares must be provided to the secret sharing system. Additionally, because the secret sharing system uses bitwise XOR to encode and decode the secret segments (e.g., combinations of secret shares are XORed together per tetrahedron code to retrieve the secret) without relying on other keys, hashes, or polynomials, the computational power required to perform the encoding and decoding processes is reduced. Further, the size of the secret shares may be at most, only up to seven bytes greater than the secret itself, and in many cases is the same size as the secret itself, reducing the storage requirements for securing the secret.

The systems and methods disclosed herein may be used in a variety of applications. For example, banking and financial institutions may use the systems and methods for sharing a code to a bank vault, by distributing secret shares to the bank account holders (including joint accounts) and corresponding bank branch manager. As another example, trusted third party (TTP) applications may be aided by having equal distribution of secret shares of a secret with both parties in an e-commerce exchange participating in the fair exchange. As an additional example, in electronic voting applications, a citizen's vote data may be shared in a distributed manner to avoid a data breach. A TTP equipped with secret sharing may be used to encode, split, and transfer data through multiple packets and/or routes, may make snooping into voting data more difficult unless all shares are snooped. As a further example, the systems and methods may be used to protect cryptographic keys and signatures during key distribution and storage. Cryptographic keys, such as private keys, are used in many secure systems for encryption and signing. These keys are vulnerable and would be better secured using the disclosed systems and methods to split, encode, and store the secret shares. Signatures, such as hashes and security certificates used in encryption, may also be stored or distributed securely with an added layer of secret sharing, such as in a multi-party use case. Another example is in cloud infrastructure applications. Most internet of things (IoT) applications store private user data in an encrypted form in cloud infrastructure by multiple providers. Secret sharing using the disclosed systems and methods may reduce the risk of a data breach by encrypting private data (e.g., keys) before distribution and storage in the cloud. Using the disclosed systems and methods may assist with complying with General Data Protection Regulation (GDPR). Finally, another example is in military applications.

Although examples have been described above, other variations and examples may be made from this disclosure without departing from the spirit and scope of these disclosed examples.

The invention claimed is:

1. An apparatus, comprising:
    a data splitting circuit to:
        receive a secret; and
        generate a first secret segment, a second secret segment, a third secret segment, and a fourth secret segment based on the secret; and
    a secret share encoding circuit to:
        generate a first secret share by application of an exclusive OR (XOR) operation to the first, second, and third secret segments;
        generate a second secret share by application of the XOR operation to the second, third, and fourth secret segments;
        generate a third secret share by application of the XOR operation to the third, fourth, and first secret segments; and
        generate a fourth secret share by application of the XOR operation to the fourth, first, and second secret segments; and
    the data splitting circuit further to:
        transmit the first, second, third, and fourth secret shares to a second apparatus for a secret sharing.

2. The apparatus of claim 1, wherein the data splitting circuit is to:
    add sufficient information to the secret such that the secret is divisible by four; and
    write to a header of at least one of the first, second, third, and fourth secret shares indicating the sufficient information added to the secret.

3. The apparatus of claim 1, wherein the secret share encoding circuit is to assign a share identifier to the first, second, third, and fourth secret shares to indicate an order of generation of the first, second, third, and fourth secret shares; and
    the data splitting circuit is to write to a header of the first, second, third, and fourth secret shares indicating share identifier.

4. The apparatus of claim 1, wherein generation of the first, second, third, and fourth secret segments comprises generation of the first, second, third, and fourth secret segments in a predetermined order.

5. The apparatus of claim 1, wherein generation of the first secret share includes:
    application of a first bitwise XOR of the first secret segment with the second secret segment; and
    application of a second bitwise XOR of a result of the first bitwise XOR with the third secret segment.

6. An apparatus, comprising:
    a secret share decoding circuit to:
        receive a first secret share, a second secret share, a third secret share, and a fourth secret share;
        generate a first secret segment by application of an exclusive OR (XOR) operation to share encoded data of the first, third, and fourth secret shares;
        generate a second secret segment by application of the XOR operation to share encoded data of the first, second, and fourth secret shares;
        generate a third secret segment by application of the XOR operation to first, share encoded data of the first, second and third secret shares; and
        generate a fourth secret segment by application of the XOR operation to share encoded data of the second, third, and fourth secret shares; and
    a data aggregating circuit to:
        receive the first, second, third, and fourth secret segments; and
        recreate a secret by combining the first, second, third, and fourth secret segments.

7. The apparatus of claim 6, wherein the data aggregating circuit is to truncate the secret to remove sufficient information added to the secret based on a secret length field in a header of at least one of the first, second, third, or fourth secret share.

8. The apparatus of claim 6, wherein the data aggregating circuit is to recreate the secret by combining the first, second, third, and fourth secret segments based on a share identifier.

9. The apparatus of claim 6, wherein the first, second, third, and fourth secret share are received from at least two different transmission media sources.

10. The apparatus of claim 6, wherein generation of the first secret segment includes:
    application of a first bitwise XOR of share encoded data of the first secret share with share encoded data of the third secret share; and
    application of a second bitwise XOR of a result of a first bitwise XOR with share encoded data of the fourth secret share.

11. The apparatus of claim 6, comprising:
    transmitting the recreated secret.

12. A method comprising:
    receiving a secret;
    generating a first secret segment, a second secret segment, a third secret segment, and a fourth secret segment based on the secret;
    generating a first secret share by application of an exclusive OR (XOR) operation to the first, second, and third secret segments;
    generating a second secret share by application of the XOR operation to the second, third, and fourth secret segments;
    generating a third secret share by application of the XOR operation to the third, fourth, and first secret segments;
    generating a fourth secret share by application of the XOR operation to the fourth, first, and second secret segments; and
    transmitting the first, second, third, and fourth secret shares for a secret sharing.

13. The method of claim 12, comprising:
    adding sufficient information to the secret such that the secret is divisible by four; and
    writing to a header of at least one of the first, second, third, and fourth secret shares indicating the sufficient information added to the secret.

14. The method of claim 12, comprising:
    assigning a share identifier to the first, second, third, and fourth secret shares to indicate an order of generation of the first, second, third, and fourth secret shares; and
    writing to a header of the first, second, third, and fourth secret shares indicating the share identifier.

15. The method of claim 12, wherein generation of the first, second, third, and fourth secret segments comprises generation of the first, second, third, and fourth secret segments in a predetermined order.

16. The method of claim 12, wherein generation of the first secret share includes:

application of a first bitwise XOR of the first secret segment with the second secret segment; and application of a second bitwise XOR of a result of the first bitwise XOR with the third secret segment.

17. A method, comprising:

receiving a first secret share, a second secret share, a third secret share, and a fourth secret share;

generating a first secret segment by application of an exclusive OR (XOR) operation to share encoded data from the first, third, and fourth secret shares;

generating a second secret segment by application of the XOR operation to share encoded data from the first, second, and fourth secret shares;

generating a third secret segment by application of the XOR operation to share encoded data from the first, second, and third secret shares;

generating a fourth secret segment by application of the XOR operation to share encoded data from the second, third, and fourth secret shares; and recreating a secret by combining the first, second, third, and fourth secret segments.

18. The method of claim 17, comprising:

truncating the secret to remove sufficient information added to the secret based on a secret length field in a header of at least one of the first, second, third, or fourth secret share.

19. The method of claim 17, comprising:

recreating the secret by combining the first, second, third, and fourth secret segments based on a share identifier.

20. The method of claim 17, comprising receiving the first, second, third, and fourth secret share from at least two different transmission media sources.

21. The method of claim 17, wherein generation of the first secret segment includes:

application of a first bitwise XOR of share encoded data of the first secret share with share encoded data of the third secret share; and application of a second bitwise XOR of the result of a first bitwise XOR with share encoded data of the fourth secret share.

* * * * *